United States Patent
Watanabe et al.

(10) Patent No.: US 11,193,040 B2
(45) Date of Patent: Dec. 7, 2021

(54) COATING AGENT FOR RUBBER-COATED CYLINDER HEAD GASKET AND CYLINDER HEAD GASKET

(71) Applicant: NICHIAS CORPORATION, Tokyo (JP)

(72) Inventors: Tomokazu Watanabe, Tokyo (JP); Nahoko Kitajima, Tokyo (JP); Hideaki Mori, Tokyo (JP); You Nakajima, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 100 days.

(21) Appl. No.: 16/466,449

(22) PCT Filed: Dec. 1, 2017

(86) PCT No.: PCT/JP2017/043338
§ 371 (c)(1),
(2) Date: Jun. 4, 2019

(87) PCT Pub. No.: WO2018/105531
PCT Pub. Date: Jun. 14, 2018

(65) Prior Publication Data
US 2019/0309186 A1    Oct. 10, 2019

(30) Foreign Application Priority Data
Dec. 6, 2016    (JP) ............................. JP2016-236475

(51) Int. Cl.
| | |
|---|---|
| C09D 175/04 | (2006.01) |
| F16J 15/10 | (2006.01) |
| C09D 7/65 | (2018.01) |
| C08L 9/06 | (2006.01) |
| C08L 15/00 | (2006.01) |
| C08L 15/02 | (2006.01) |
| F02F 11/00 | (2006.01) |
| F16J 15/02 | (2006.01) |
| F16J 15/08 | (2006.01) |
| C09K 3/10 | (2006.01) |
| B32B 15/06 | (2006.01) |
| C09D 7/40 | (2018.01) |
| C08G 18/80 | (2006.01) |

(52) U.S. Cl.
CPC ............ C09D 175/04 (2013.01); B32B 15/06 (2013.01); C08L 9/06 (2013.01); C08L 15/005 (2013.01); C08L 15/02 (2013.01); C09D 7/40 (2018.01); C09D 7/65 (2018.01); C09K 3/10 (2013.01); F02F 11/00 (2013.01); F02F 11/002 (2013.01); F16J 15/022 (2013.01); F16J 15/08 (2013.01); F16J 15/102 (2013.01); C08G 18/80 (2013.01)

(58) Field of Classification Search
CPC .......... C09D 175/04; C09D 7/65; C09D 7/40; B32B 15/06; C08L 9/06; C08L 15/005; C08L 15/02; C09K 3/10; F02F 11/00; F02F 11/002; F16J 15/022; F16J 15/08; F16J 2015/0856; C08G 18/80
See application file for complete search history.

(56) References Cited

U.S. PATENT DOCUMENTS

2013/0285334 A1    10/2013    Kojima et al.

FOREIGN PATENT DOCUMENTS

| | | | |
|---|---|---|---|
| CN | 103459141 A | 12/2013 | |
| DE | 3905922 A1 * | 8/1990 | ............ F16J 15/123 |
| JP | 3-252442 A | 11/1991 | |
| JP | 5-341494 A | 12/1993 | |
| JP | 7-233873 A | 9/1995 | |
| JP | 9-157588 A | 6/1997 | |
| JP | 2001-31862 A | 2/2001 | |
| JP | 2003-213122 A | 7/2003 | |
| JP | 2004-76699 A | 3/2004 | |
| JP | 2008-189892 A | 8/2008 | |
| JP | 2008-260809 A | 10/2008 | |
| JP | 2014-193454 A | 10/2014 | |
| JP | 2016-8254 A | 1/2016 | |
| WO | 2014/050722 A1 | 4/2014 | |

OTHER PUBLICATIONS

International Search Report dated Feb. 6, 2018, issued in counterpart application No. PCT/JP2017/043338, w/English translation (5 pages).
Written Opinion dated Feb. 6, 2018, issued in counterpart application No. PCT/JP2017/043338 (5 pages).
Extended (Supplementary) European Search Report dated Jul. 13, 2020, issued in counterpart application No. 17878921.0. (8 pages).
Office Action dated Sep. 1, 2020, issued in counterpart CN Application No. 201780075581.7, with English translation (10 pages).

* cited by examiner

*Primary Examiner* — Gilbert Y Lee
(74) *Attorney, Agent, or Firm* — Westerman, Hattori, Daniels & Adrian, LLP

(57) ABSTRACT

A coating agent for a rubber-coated cylinder head gasket contains a lubricant and a urethane resin. The lubricant is unsintered polytetrafluoroethylene resin particles having an average primary particle size of 1 μm or less. The amount of the unsintered polytetrafluoroethylene resin particles in a solid content is 30 to 80% by volume. The present invention provides a coating agent for a rubber-coated cylinder head gasket that can form a coat that is highly wear-resistant under high contact pressure and high temperature conditions and with which a rubber layer is less likely to stick to the seal face of the cylinder block or the cylinder head after the use under high contact pressure and high temperature conditions, and a cylinder head gasket obtained using the coating agent.

7 Claims, No Drawings

COATING AGENT FOR RUBBER-COATED CYLINDER HEAD GASKET AND CYLINDER HEAD GASKET

TECHNICAL FIELD

The present invention relates to a coating agent for coating a rubber layer of a cylinder head gasket having a surface coated with the rubber layer of nitrile-butadiene rubber or fluoro rubber, and a cylinder head gasket having a rubber layer coated with a cured product of the coating agent.

BACKGROUND ART

Conventionally, coating films are provided on surfaces of rubber elastic bodies of rubber-coated metal gaskets, for preventing sticking, improving wear resistance, and other purposes. However, in spite of these coating films, when exposed to engine vibration under high pressure contact and high temperature conditions of the engine gasket, the rubber coat on the gasket surface becomes worn to cause leakage of fluid such as gas, coolant, and oil.

Then, in order to improve wear resistance, various coating agents have been proposed (for example, Patent Literatures 1 to 4).

CITATION LIST

Patent Literatures

[Patent Literature 1] Japanese Patent Application Laid-Open Publication No. 3-252442
[Patent Literature 2] Japanese Patent Application Laid-Open Publication No. 5-341494
[Patent Literature 3] Japanese Patent Application Laid-Open Publication No. 2008-260809
[Patent Literature 4] Japanese Patent Application Laid-Open Publication No. 2008-189892

SUMMARY OF THE INVENTION

Problems to be Solved by the Invention

Unfortunately, the coats obtained from the coating agents in Patent Literatures 1 to 4 have low wear resistance against repeated friction resulting from contact with a member of the flange. In particular, the wear resistance is low against repeated friction resulting from contact with a member of the flange under high contact pressure and high temperature conditions.

More specifically, in a rubber-coated cylinder head gasket, the coated rubber layer formed of nitrile-butadiene rubber, fluoro rubber, hydrogenated nitrile-butadiene rubber, or acrylic rubber has the advantage of high oil resistance. However, the conventional coating agents do not ensure sufficient wear resistance to the contact between the gaskets or between the gasket and the flange under high contact pressure and high temperature conditions, and the rubber layer is easily worn.

In a rubber-coated cylinder head gasket coated with rubber, specifically, nitrile-butadiene rubber, fluoro rubber, hydrogenated nitrile-butadiene rubber, or acrylic rubber using a conventional coating agent, the rubber layer may firmly stick to the seal face of the cylinder block or the cylinder head after the use under high contact pressure and high temperature conditions to adversely affect the work efficiency during maintenance of the engine including replacement of the cylinder head gasket.

An object of the present invention is therefore to provide a coating agent for a rubber-coated cylinder head gasket that can form a coat that is highly wear-resistant under high contact pressure and high temperature conditions and with which a rubber layer is less likely to stick to the seal face of the cylinder block or the cylinder head after the use under high contact pressure and high temperature conditions, and a cylinder head gasket obtained using the coating agent.

Means for Solving the Problem

The problem above is solved by the following invention.
The present invention (1) provides a coating agent for a rubber-coated cylinder head gasket, in which
the coating agent contains a lubricant and a urethane resin,
the lubricant is unsintered polytetrafluoroethylene resin particles having an average primary particle size of 1 μm or less, and
the amount of the unsintered polytetrafluoroethylene resin particles in a solid content is 30 to 80% by volume.

The present invention (2) provides the coating agent for a rubber-coated cylinder head gasket according to (1), in which the amount of the unsintered polytetrafluoroethylene resin particles in a solid content is 33 to 78% by volume.

The present invention (3) provides the coating agent for a rubber-coated cylinder head gasket according to (1) or (2), in which the coating agent contains a curing agent, and the curing agent is polyisocyanate.

The present invention (4) provides the coating agent for a rubber-coated cylinder head gasket according to (3), in which the polyisocyanate is blocked polyisocyanate.

The present invention (5) provides the coating agent for a rubber-coated cylinder head gasket according to any one of (1) to (4), in which rubber in the rubber-coated cylinder head gasket is nitrile-butadiene rubber, fluoro rubber, hydrogenated nitrile-butadiene rubber, or acrylic rubber.

The present invention (6) provides the rubber-coated cylinder head gasket according to (5), in which the rubber is nitrile-butadiene rubber or fluoro rubber.

The present invention (7) provides a cylinder head gasket including at least a metal plate, a rubber layer covering the metal plate, and a cured product of the coating agent for a rubber-coated cylinder head gasket according to any one of (1) to (5) that is formed on a surface of the rubber layer.

Effects of the Invention

The present invention provides a coating agent for a rubber-coated cylinder head gasket that can form a coat that is highly wear-resistant under high contact pressure and high temperature conditions and with which a rubber layer is less likely to stick to the seal face of the cylinder block or the cylinder head after the use under high contact pressure and high temperature conditions, and a cylinder head gasket obtained using the coating agent.

DESCRIPTION OF EMBODIMENTS

A coating agent for a rubber-coated cylinder head gasket in the present invention contains a lubricant and a urethane resin. The lubricant is unsintered polytetrafluoroethylene resin particles having an average primary particle size of 1 μm or less. The amount of the unsintered polytetrafluoroethylene resin particles in a solid content is 30 to 80% by volume.

The coating agent for a rubber-coated cylinder head gasket in the present invention is applied on a surface of a rubber layer of the rubber-coated cylinder head gasket serving as a coating target and cured by heating to form a coat of a cured product on the surface of the rubber layer.

The rubber-coated cylinder head gasket using the coating agent for a rubber-coated cylinder head gasket in the present invention at least includes a metal base material and a rubber layer formed of a rubber material to coat the metal base material. The rubber layer formed of a rubber material may be bonded to the metal base material with an adhesive layer interposed. The rubber material forming the rubber layer may be any material that is used for rubber-coated cylinder head gaskets. Preferable examples include nitrile butadiene rubbers such as nitrile-butadiene rubber, hydrogenated nitrile-butadiene rubber, and functional group-modified nitrile-butadiene rubber, fluoro rubbers such as binary fluoro rubber that is a vinylidene fluoride-hexafluoropropylene copolymer and tertiary fluoro rubber that is a vinylidene fluoride-hexafluoropropylene-tetrafluoroethylene copolymer, and acrylic rubbers. Nitrile-butadiene rubber and fluoro rubber are especially preferred.

The coating agent for a rubber-coated cylinder head gasket in the present invention contains only unsintered polytetrafluoroethylene resin particles as a lubricant. That is, the coating agent for a rubber-coated cylinder head gasket in the present invention does not contain a solid lubricant other than the unsintered polytetrafluoroethylene resin, such as graphite and molybdenum disulfide, as a lubricant and does not contain a liquid lubricant such as hydrocarbon wax such as polyethylene and polypropylene and silicone wax.

In the coating agent for a rubber-coated cylinder head gasket in the present invention, the polytetrafluoroethylene resin used as a lubricant is unsintered polytetrafluoroethylene resin. The molecular weight of the unsintered polytetrafluoroethylene resin according to the present invention is preferably 0.1 million to 10 million, particularly preferably 1 million to 10 million. The average primary particle size of the unsintered polytetrafluoroethylene resin particles according to the present invention is 1 μm or less, preferably 0.15 to 0.4 μm. The average primary particle size within the range above of the unsintered polytetrafluoroethylene resin particles can increase the wear resistance of the coat formed from the coating agent under high contact pressure and high temperature conditions. The unsintered polytetrafluoroethylene resin particles according to the present invention are produced by emulsion polymerization.

The unsintered polytetrafluoroethylene resin particles used in preparation of the coating agent for a rubber-coated cylinder head gasket in the present invention are particulate resin dispersed in a solvent.

The coating agent for a rubber-coated cylinder head gasket in the present invention at least contains a urethane resin as a binder for retaining the unsintered polytetrafluoroethylene resin particles in the cured product of the coating agent for a rubber-coated cylinder head gasket in the present invention and, if necessary, contains a curing agent together with the urethane resin.

Examples of the urethane resin in the coating agent for a rubber-coated cylinder head gasket in the present invention include, but not limited to, for example, aromatic urethane resin, ester urethane resin, and ether urethane resin.

The aromatic urethane resin is a urethane resin having an aromatic group as a repeating unit. Examples of the aromatic group include substituted or non-substituted aromatic hydrocarbon groups having 6 to 14 carbon atoms. The ether urethane resin is a urethane resin having an ether bond as a repeating unit. The ester urethane resin is a urethane resin having an ester bond as a repeating unit.

The molecular weight of the urethane resin is preferably 1000 to 1000000. The tensile strength of the urethane resin is preferably 10 N/mm$^2$ or more, particularly preferably 15 to 100 N/mm$^2$. The urethane resin having tensile strength within the range above can increase the wear resistance of the cured product of the coating agent for a rubber-coated cylinder head gasket in the present invention under high contact pressure and high temperature conditions. The elastic modulus of the urethane resin is preferably 1 to 3000 MPa, particularly preferably 10 to 2000 MPa. The urethane resin having an elastic modulus or the urethane resin having a tensile strength within the range above can increase the wear resistance of the cured product of the coating agent for a rubber-coated cylinder head gasket in the present invention under high contact pressure and high temperature conditions.

The urethane resin may be a urethane resin not acid-modified or may be an acid-modified urethane resin. Examples of the acid modification process include a process of heating in the air atmosphere and oxidizing, a process of using an acid, and a process of using an acid group such as a hydroxy group and a carboxyl group in polyol for use in polymerization of the urethane resin.

The curing agent in the coating agent for a rubber-coated cylinder head gasket according to the present invention is a curing agent that cures when the coating agent for a rubber-coated cylinder head gasket in the present invention is applied on a coating target and heated. The resultant cured product serves as a binder that retains the lubricant in the coating agent for a rubber-coated cylinder head gasket in the present invention.

Examples of the curing agent include polyisocyanates, epoxy compounds, oxazoline compounds, carbodiimide compounds, and melamine compounds. Among those, polyisocyanates are preferred because the wear resistance under high contact pressure and high temperature conditions is increased. An example of the polyisocyanates is blocked polyisocyanates. As a curing agent, blocked polyisocyanates are preferred.

In the solid content of the coating agent for a rubber-coated cylinder head gasket in the present invention, the amount of the unsintered polytetrafluoroethylene resin particles having an average primary particle size of 1 μm or less, preferably 0.15 to 0.4 μm, is 30 to 80% by volume, preferably 33 to 78% by volume. The amount within the range above of the unsintered polytetrafluoroethylene resin particles in the solid content can increase the wear resistance of the cured product of the coating agent for a rubber-coated cylinder head gasket in the present invention under high contact pressure and high temperature conditions, and the rubber layer is less likely to stick to the seal face of the cylinder block or the cylinder head after the use in high contact pressure and high temperature conditions.

The amount of the urethane resin in the solid content of the coating agent for a rubber-coated cylinder head gasket in the present invention is preferably 20 to 70% by volume, particularly preferably 22 to 67% by volume. The amount within the range above of the urethane resin in the solid content can increase the wear resistance of the cured product of the coating agent for a rubber-coated cylinder head gasket in the present invention under high contact pressure and high temperature conditions.

The proportion of the curing agent in the solid content of the coating agent for a rubber-coated cylinder head gasket in the present invention is preferably 0 to 36% by volume, particularly preferably 0 to 30% by volume. The proportion within the range above of the curing agent in the solid content can increase the wear resistance of the cured product of the coating agent for a rubber-coated cylinder head gasket in the present invention under high contact pressure and high temperature conditions.

The total amount of the urethane resin and the curing agent in the solid content of the coating agent for a rubber-coated cylinder head gasket in the present invention is preferably 20 to 70% by volume, particularly preferably 22 to 67% by volume, more preferably 33 to 67% by volume. The total amount within the range above of the urethane resin and the curing agent in the solid content can increase the wear resistance of the cured product of the coating agent for a rubber-coated cylinder head gasket in the present invention under high contact pressure and high temperature conditions.

The ratio (curing agent/urethane resin) of the amount of the curing agent to the amount of the urethane resin in the solid content of the coating agent for a rubber-coated cylinder head gasket in the present invention is preferably 0 to 1, particularly preferably 0 to 0.5. The ratio within the range above of the amount of the curing agent to the amount of the urethane resin in the solid content can increase the wear resistance of the cured product of the coating agent for a rubber-coated cylinder head gasket in the present invention under high contact pressure and high temperature conditions.

The coating agent for a rubber-coated cylinder head gasket in the present invention may contain a surfactant and a pigment, in addition to the unsintered polytetrafluoroethylene resin particles, the urethane resin, and the curing agent. It should be noted that the coating agent for a rubber-coated cylinder head gasket in the present invention does not include a lubricant other than the unsintered polytetrafluoroethylene resin particles. Examples of a binder other than the urethane resin and the curing agent include silicone resin and NBR. In order to protect the rubber layer having a seal function, the coating agent for a rubber-coated cylinder head gasket in the present invention has the effect of protecting the rubber layer such that the coating layer itself is gradually worn for energy from the surface and the coating layer itself dissipates energy. Thus, if an additive such as a silane coupling agent that improves the bonding to the rubber layer is included, the energy from the surface is transmitted through the interface between the coating layer and the rubber layer, thereby reducing the effect. If a filling material for reinforcement such as a filler is included, the strength of the coating layer itself is increased, and the coating layer itself is less worn, so that energy from the surface is transmitted to the rubber layer, thereby reducing the effect. For this reason, the coating layer in the present invention does not contain a coupling agent such as a silane coupling agent or a filling material for reinforcement such as a filler.

The coating agent for a rubber-coated cylinder head gasket in the present invention is a dispersion liquid in which the solid content described above, specifically, the unsintered polytetrafluoroethylene resin particles and the urethane resin, or the unsintered polytetrafluoroethylene resin particles and the urethane resin and additionally a curing agent and, if necessary, a component other than the unsintered polytetrafluoroethylene resin particles, the urethane resin, and the curing agent, are dispersed in a solvent. The solvent may be water or an organic solvent. Examples of the organic solvent include aromatic hydrocarbons, esters, and ketones, more specifically, toluene, xylene, ethyl acetate, butyl acetate, acetone, methyl ethyl ketone, methyl isobutyl ketone, di-n-propylketone, cyclohexanone, phorone, isophorone, ethyl cellosolve, and methyl cellosolve.

The solid content concentration in the coating agent for a rubber-coated cylinder head gasket in the present invention is selected as appropriate according to the purpose of use, typically 5 to 50% by mass, preferably 10 to 40% by mass.

The coating agent for a rubber-coated cylinder head gasket in the present invention is prepared by any method, for example, prepared by adding the components above in a solvent and dispersing the solid content in the solvent by stirring.

The coating agent for a rubber-coated cylinder head gasket in the present invention is applied on a target surface and heated after drying to be cured to form a coat of a cured product of the coating agent for a rubber-coated cylinder head gasket in the present invention on the target surface. In other words, the coating agent for a rubber-coated cylinder head gasket in the present invention is used as a surface coating agent that forms a coat of a cured product on a target surface.

The target to be coated with a coat of a cured product using the coating agent for a rubber-coated cylinder head gasket in the present invention is a rubber layer that covers a metal base material of a cylinder head gasket. The rubber material that forms the rubber layer is any material that is used for rubber-coated cylinder head gaskets. Preferred examples include nitrile butadiene rubbers such as nitrile-butadiene rubber (NBR), hydrogenated nitrile-butadiene rubber (H-NBR), and functional group-modified nitrile-butadiene rubber, fluoro rubbers such as binary fluoro rubber that is a vinylidene fluoride-hexafluoropropylene copolymer and tertiary fluoro rubber that is a vinylidene fluoride-hexafluoropropylene-tetrafluoroethylene copolymer, and acrylic rubbers. Nitrile-butadiene rubber and fluoro rubber are especially preferred.

The hardness of the rubber layer is usually 10 to 200 $N/mm^2$. The hardness is Martens hardness measured, for example, using a nanoindentation tester ENT-2100 (manufactured by Elionix Inc.) using a Berkovich tip.

The coating agent for a rubber-coated cylinder head gasket in the present invention is applied on a target surface, for example, by applying the coating agent for a rubber-coated cylinder head gasket in the present invention on a target surface by a spray, a roll coater, a flow coater, ink jetting, or the like.

The coating agent for a rubber-coated cylinder head gasket in the present invention is applied on a target surface and then dried to remove the solvent, followed by heating at 100 to 300° C. to form a coat of the cured product of the coating agent for a rubber-coated cylinder head gasket in the present invention on the target surface. The heating temperature for curing is selected as appropriate according to the kinds of the urethane resin and the curing agent.

The thickness of the coat of the cured product of the coating agent for a rubber-coated cylinder head gasket in the present invention that is formed on a target surface is selected as appropriate, usually 1 to 6 μm, preferably 1.5 to 5 μm.

The coating agent for a rubber-coated cylinder head gasket in the present invention can form a coat (coating layer) that is highly wear-resistant under high contact pressure and high temperature conditions and with which the rubber layer is less likely to stick to the seal face of the cylinder block or the cylinder head after the use under high contact pressure and high temperature conditions, on the rubber layer of the rubber-coated cylinder head gasket.

The cylinder head gasket in the present invention at least has a metal plate, a rubber layer covering the metal plate, and a cured product of the coating agent for a rubber-coated cylinder head gasket in the present invention that is formed on a surface of the rubber layer.

The metal plate in the cylinder head gasket in the present invention is a SUS metal plate shaped in the form of a cylinder head gasket.

A metal-treated layer may be provided on a surface of the metal plate of the cylinder head gasket in the present invention. In the cylinder head gasket in the present invention, the rubber layer may be provided directly on a surface of the metal plate or may be bonded to a surface of the metal plate with an adhesive layer interposed.

More specifically, examples of the configuration of the cylinder head gasket in the present invention include (i) rubber layer→cured product of the coating agent layered in this order on a surface of the metal plate, (ii) adhesive layer→rubber layer→cured product of the coating agent layered in this order on a surface of the metal plate, (iii) metal-treated layer→rubber layer→cured product of the coating agent layered in this order on a surface of the metal plate, and (iv) metal-treated layer→adhesive layer→rubber layer→cured product of the coating agent layered in this order on a surface of the metal plate.

The metal-treated layer in the cylinder head gasket in the present invention is formed on a surface of the metal plate. Examples of the metal-treated layer include a zinc phosphate coat, a ferric phosphate coat, an applied chromate coating, and a coat containing at least one or more of a vanadium compound, a zirconium compound, a titanium compound, a molybdenum compound, a tungsten compound, a manganese compound, a zinc compound, and a cerium compound. Examples of the metal-treated layer include a metal-treated layer formed using a metal-treated layer-forming agent containing an organic metal compound having at least one or more chelate rings and an alkoxy group, a metal-treated layer formed using a metal-treated layer-forming agent containing a metal oxide or silica, and preferably, a metal-treated layer formed using a metal-treated layer-forming agent containing an amino group-containing alkoxysilane and a vinyl group-containing alkoxysilane.

The adhesive layer in the cylinder head gasket in the present invention is formed on a surface of the metal plate or, when a metal-treated layer is formed, on a surface of the metal-treated layer. The adhesive layer is formed using a vulcanizing adhesive according to the kind of rubber to be bonded. A vulcanizing adhesive such as silane, phenolic resin, epoxy resin, and urethane resin is used as the vulcanizing adhesive.

The rubber material that forms the rubber layer in the cylinder head gasket in the present invention is any material that is used for rubber-coated cylinder head gaskets. Preferred examples include nitrile butadiene rubbers such as nitrile-butadiene rubber (NBR), hydrogenated nitrile-butadiene rubber (H-NBR), and functional group-modified nitrile-butadiene rubber, fluoro rubbers such as binary fluoro rubber that is a vinylidene fluoride-hexafluoropropylene copolymer and tertiary fluoro rubber that is a vinylidene fluoride-hexafluoropropylene-tetrafluoroethylene copolymer, and acrylic rubbers. Nitrile butadiene rubbers and fluoro rubbers are especially preferred.

The rubber layer is provided, for example, by mixing predetermined amounts of a cross-linking additive, a filling material, and other additives with a rubber material to produce a rubber compound, which is dissolved and dispersed in an organic solvent such as toluene and applied on a metal plate.

In the cylinder head gasket in the present invention, the thickness of the rubber layer is preferably 15 to 35 μm, particularly preferably 17 to 33 μm. The thickness of the rubber layer in the range above is preferred because the rubber-coated cylinder head gasket need to fill the surface coarseness produced in processing of the cylinder block to prevent leakage of fluids. In the cylinder head gasket in the present invention, the thickness of the coat formed of the cured product of the coating agent for a rubber-coated cylinder head gasket in the present invention is 1 to 6 μm, preferably 1.5 to 5 μm. Since the rubber-coated cylinder head gasket requires wear resistance, the thickness of the coat formed of the cured product of the coating agent is set in the range above.

EXAMPLES

Example 1

<Production of Rubber-Metal Laminate Unvulcanized Product>

A stainless steel plate (SUS301H) having a thickness of 0.2 mm was used as a metal plate. After the surface of the stainless steel plate was treated with an alkaline degreaser, a phosphate-based agent was used to form an anti-rust coat (metal-treated layer) of ferric phosphate on both surfaces of the metal plate. Subsequently, an adhesive layer mainly composed of a phenolic resin and modified by a nitrile rubber (NBR) compound was formed on the surface of the anti-rust coat.

Subsequently, on the surface of the adhesive layer, a rubber compound liquid having the composition below was applied to a predetermined thickness and dried in a hot air circulating oven at 60° C. for 1 minute to yield a rubber-metal laminate unvulcanized product.

| <Nitrile Rubber (NBR) Compound Composition> | |
|---|---|
| nitrile rubber | 100 phr |
| hydrozincite | 5 phr |
| stearic acid | 0.5 phr |
| carbon | 80 phr |
| coumarone-indene resin | 3 phr |
| antioxidant | 2 phr |
| plasticizer | 10 phr |
| sulfur | 1 phr |
| vulcanization accelerator | 2 phr |

<Preparation of Coating Agent>

Each component contained in the solid content in the proportion shown in Table 1 was added to a solvent toluene, butyl acetate, ethyl acetate to prepare a coating agent having a solid content concentration of 30% by mass. The components of the solid content used in preparation of the coating agent are as follows.

(Lubricant)
  unsintered polytetrafluoroethylene resin particles: average particle size 0.3 μm, molecular weight 1 million to 10 million (Urethane Resin)
  urethane resin A: tensile strength 68 N/mm$^2$, urethane resin
  urethane resin B: acid-modified urethane resin (Curing Agent)
block isocyanate: dissociation temperature 120° C. or higher, brown liquid <Formation of Coat of Cured Product>

On a surface of the above-noted rubber-metal laminate unvulcanized product, the coating agent was applied and heated in a hot air circulating oven at 240° C. for 10 minutes to yield a surface-coated rubber-metal laminate having a cured product coat on the surface of the rubber-metal laminate. The thickness of the cured product coat of the coating agent was 2 µm, and the surface hardness of the rubber-metal laminate was 20 N/mm².

<Evaluation of Wear Resistance>

The surface-coated rubber-metal laminate was subjected to the following test. The result is shown in Table 1.

The surface-coated rubber-metal laminate was cut into a width of 50 mm and a length of 50 mm to prepare a test piece. Subsequently, a reciprocating movement test was performed using a pin-on-disk friction and wear testing machine FPR-2100 manufactured by RHESCA Co., LTD. and using as a counterpart a pin with a radius of R5 to which the surface-coated rubber-metal laminate having an R5 depression was affixed by an adhesive, with engine oil dropped on the test piece, under the conditions: linear velocity of 1.05 mm/sec, with reciprocating rotation radius R1, and a load of 1300 g (150° C.). The friction coefficient under the engine oil environment between the cured products of the coating agent was measured. The lower the coefficient of friction between the cured products of the coating agent is, the higher the wear resistance is.

<Evaluation of Stickiness>

The surface-coated rubber-metal laminate and the aluminum plate (thickness of 0.2 mm) were each cut into a width of 20 mm and a length of 50 mm and bonded to each other at the edge of 20 mm×20 mm. When bonded, the laminate and the aluminum plate were bonded in the presence of coolant (LLC), followed by compression bonding at 170° C. for 14 hours at 1.5 MPa. Subsequently, a tensile shear test was conducted using an autograph AG-50kNG manufactured by Shimadzu Corporation under room temperature to measure the shear load. The lower the shear load is, the less sticking the rubber layer is.

Examples 2 to 4 and Comparative Examples 1 and 2

Examples 2 to 4 and Comparative Examples 1 and 2 are similar to Example 1 except that the compositions in the solid content were contained in the proportions shown in Table 1 in preparation of the coating agent. The result is shown in Table 1.

Example 5

Example 5 is similar to Example 1 except that a fluoro rubber compound shown below was used instead of the NBR rubber compound. The result is shown in Table 1.

| <Fluoro Rubber (FKM) Compound Composition> | |
|---|---|
| fluoro rubber | 100 phr |
| carbon | 40 phr |
| calcium hydroxide | 3 phr |
| magnesium oxide | 3 phr |
| calcium carbonate | 20 phr |
| bisphenol AF | 3 phr |
| vulcanization accelerator | 1 phr |

Comparative Example 3

Comparative Example 3 is similar to Example 3 except that molybdenum disulfide was used as a lubricant, rather than using the unsintered polytetrafluoroethylene resin particles as a lubricant. The result is shown in Table 1.

Comparative Example 4

Comparative Example 4 is similar to Example 3 except that graphite was used as a lubricant, rather than using the unsintered polytetrafluoroethylene resin particles as a lubricant. The result is shown in Table 1.

TABLE 1

| | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Material of rubber layer | NBR | NBR | NBR | NBR | FKM | NBR | NBR | NBR | NBR |
| Proportion of each component in solid content (% by volume) | | | | | | | | | |
| Unsintered PTFE resin | 35 | 50 | 75 | 35 | 35 | 10 | 28 | — | — |
| Molybdenum dichloride | — | — | — | — | — | — | — | 75 | — |
| Graphite | — | — | — | — | — | — | — | — | 75 |
| Urethan resin A | 65 | 50 | 25 | 45 | 65 | 90 | 72 | 25 | 25 |
| Block isocyanate | — | — | — | 20 | — | — | — | — | — |
| Friction coefficient | 0.023 | 0.022 | 0.015 | 0.023 | 0.021 | 0.033 | 0.025 | 0.100 | 0.040 |
| Evaluation of stickiness Shear load (N) | 83 | 39 | 8 | 90 | 85 | 2000 | 829 | — | — |

The invention claimed is:

1. A coating agent for a rubber-coated cylinder head gasket,
the coating agent comprising a lubricant and a urethane resin, wherein
the lubricant is only unsintered polytetrafluoroethylene resin particles having an average primary particle size of 1 μm or less, and
the amount of the unsintered polytetrafluoroethylene resin particles in a solid content of the coating agent is 30 to 80% by volume.

2. The coating agent for a rubber-coated cylinder head gasket according to claim 1, wherein the amount of the unsintered polytetrafluoroethylene resin particles in a solid content is 33 to 78% by volume.

3. The coating agent for a rubber-coated cylinder head gasket according to claim 1, wherein the coating agent further comprises a curing agent, and the curing agent is polyisocyanate.

4. The coating agent for a rubber-coated cylinder head gasket according to claim 3, wherein the polyisocyanate is blocked polyisocyanate.

5. The coating agent for a rubber-coated cylinder head gasket according to claim 1, wherein rubber in the rubber-coated cylinder head gasket is nitrile-butadiene rubber, fluoro rubber, hydrogenated nitrile-butadiene rubber, or acrylic rubber.

6. The coating agent for a rubber-coated cylinder head gasket according to claim 5, wherein the rubber is nitrile-butadiene rubber or fluoro rubber.

7. A cylinder head gasket comprising at least a metal plate, a rubber layer covering the metal plate, and a cured product of the coating agent for a rubber-coated cylinder head gasket according to claim 1, the cured product being formed on a surface of the rubber layer.

* * * * *